United States Patent [19]
Nicholls et al.

[11] Patent Number: 4,691,148
[45] Date of Patent: Sep. 1, 1987

[54] CONTROL CIRCUIT FOR ELECTRIC VEHICLES

[76] Inventors: Robin P. Nicholls, 250 Dorking Pl., Santa Barbara, Calif. 93105; Rolland J. Savoie, 434 Venado Dr., Santa Barbara, Calif. 93110

[21] Appl. No.: 653,851

[22] Filed: Sep. 25, 1984

Related U.S. Application Data

[63] Continuation-in-part of Ser. No. 229,624, Jan. 29, 1981, abandoned.

[51] Int. Cl.⁴ .............................................. B60K 41/12
[52] U.S. Cl. ........................................ 318/12; 318/11; 318/139; 318/376
[58] Field of Search .................... 318/9, 11, 12, 13, 14, 318/15, 139, 375, 376; 180/60, 65.1, 65.2, 65.4, 70.1, 75.1, 210, 211, 65.7

[56] References Cited

U.S. PATENT DOCUMENTS

| | | | |
|---|---|---|---|
| 2,864,040 | 12/1958 | Trotsky | 318/11 X |
| 2,990,503 | 6/1961 | Clark | 318/11 |
| 3,241,019 | 3/1966 | Gross | 180/65.1 X |
| 3,621,929 | 11/1971 | Oberthur | 180/65.1 |
| 3,771,821 | 11/1973 | Rist et al. | 180/65.2 X |
| 3,837,419 | 9/1974 | Nakamura | 180/65.4 |
| 3,984,744 | 10/1976 | Moody | 318/139 X |
| 4,095,154 | 6/1978 | Williamson | 318/376 |
| 4,096,418 | 6/1978 | Marumoto et al. | 318/12 |
| 4,188,569 | 2/1980 | Campbell | 318/139 X |
| 4,306,156 | 12/1981 | Monaco et al. | 180/65.2 X |

FOREIGN PATENT DOCUMENTS

| | | | |
|---|---|---|---|
| 0621260 | 5/1961 | Canada | 318/11 |
| 3024398 | 1/1982 | Fed. Rep. of Germany | 318/12 |

Primary Examiner—William M. Shoop, Jr.
Assistant Examiner—Bentsu Ro
Attorney, Agent, or Firm—Harry W. Brelsford

[57] ABSTRACT

The foot-operated accelerator develops digital signals progressively larger in number as the accelerator is moved through its range from a rest position to full speed. A variable transmission has a sensor that generates digital signals progressively larger in number as the transmission is shifted from a low gear ratio to a high gear ratio. For starting the vehicle, the accelerator lower digital signals cause successive connection of a plurality of batteries in series until the full operating battery voltage is applied to the motor. Thereafter, the motor operates at a constant voltage and vehicle speed is varied by varying the gear ratio of the transmission. This is achieved by a digital comparator that compares the accelerator numbers with the transmission numbers, and a lower accelerator number causes the transmission to shift to a lower gear ratio, and a higher accelerator number causes the transmission to shift to a higher gear ratio until equilibrium is reached in each case. The motor is protected from excessive current and excessive rpm by varying the gear ratio. Regenerative braking is utilized on both coasting and manual application of the brakes.

12 Claims, 12 Drawing Figures

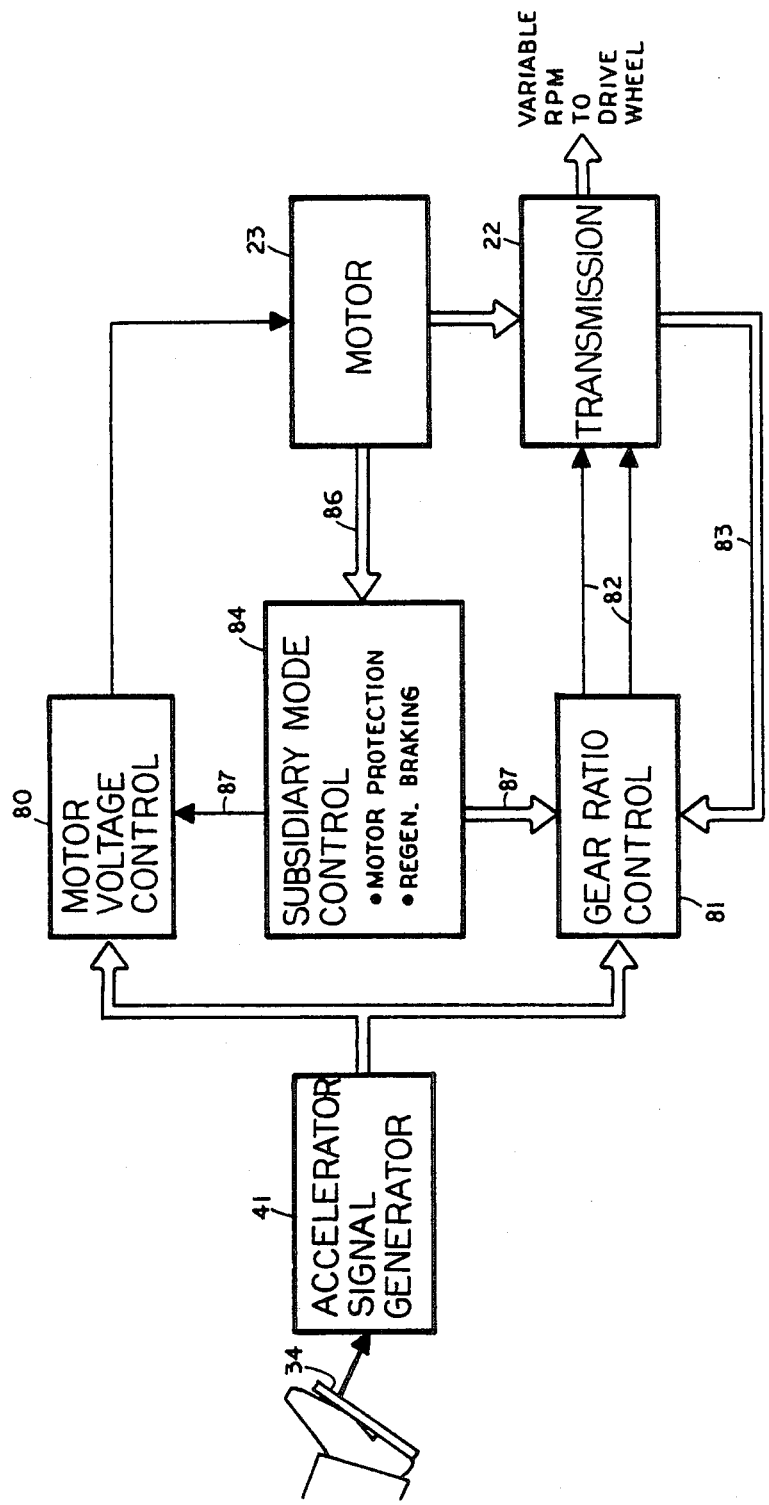

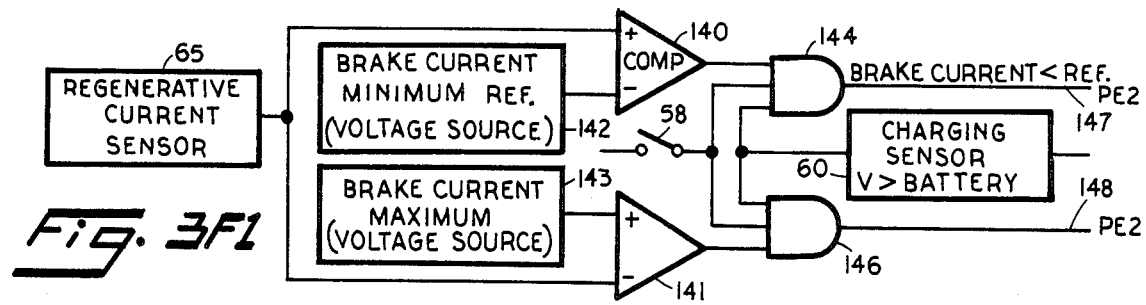
Fig. 3F1
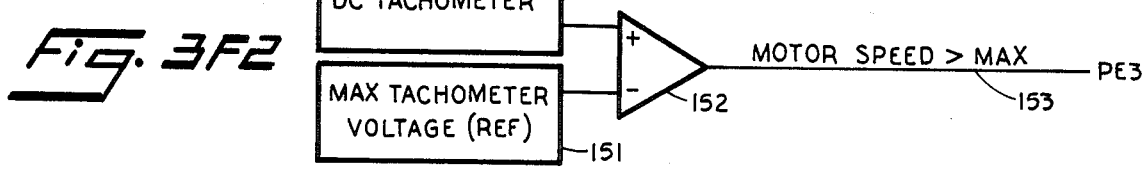
Fig. 3F2
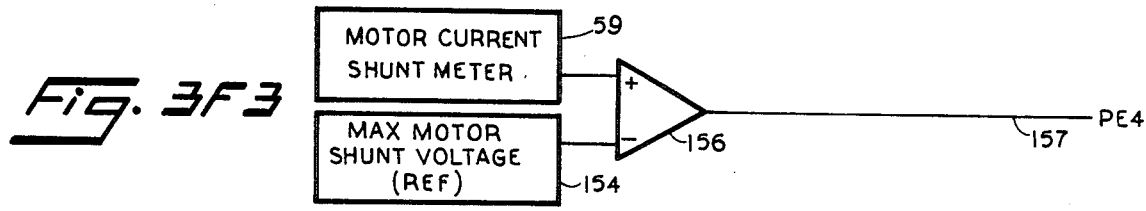
Fig. 3F3
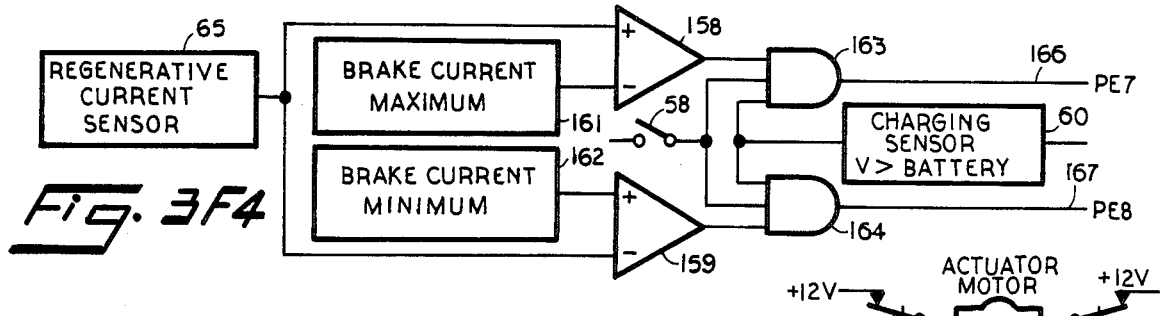
Fig. 3F4
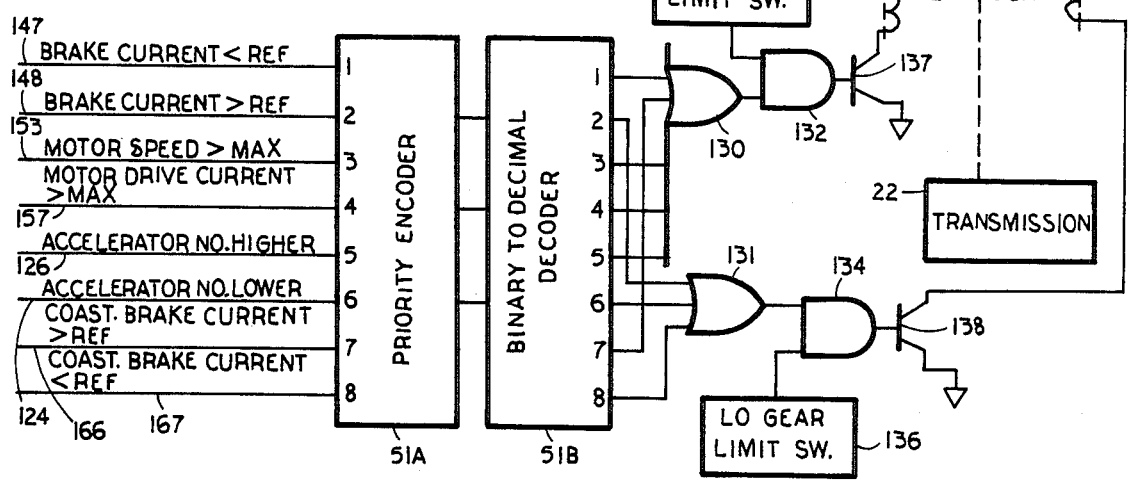
Fig. 3G

CONTROL CIRCUIT FOR ELECTRIC VEHICLES

This is a continuation-in-part of applicants' co-pending application of the same title Ser. No. 06/229,624 filed 01-29-81, now abandoned.

This invention relates to a control system for an electric vehicle for controlling vehicle speed by automatically shifting a continuously variable transmission in response to driver demand to therefore achieve a very high degree of efficiency. In addition, we employ a protection circuit for shifting the transmission at maximum motor rpm and at maximum motor current.

BACKGROUND OF THE INVENTION

Battery-operated electric vehicles, especially commuter passenger automobiles, must be highly efficient in order to obtain a practical range for a given weight of batteries and to obtain desirable vehicle speeds. Even slight gains in electric efficiency are important in making such vehicles competitive with internal combustion engine vehicles. Conventionally, direct drive has been used, and the vehicle speed has been controlled by changing the armature and/or field current of the driving electric motors. This has been achieved by connecting more or fewer batteries in series to obtain a varying voltage source. More commonly, the voltage has remained constant, and the current has been increased by chopping it into greater or shorter time durations. Current-chopping generally uses silicon-controlled rectifiers or power transistors to convert dc to a variable-duty cycle dc. These require a high voltage (100 v is typical) to reduce power losses. The efficiency of such chopper circuits is about eighty-five percent maximum at half speed at their optimum voltage. An increase in efficiency is necessary for public acceptance of electric commuter vehicles.

We have devised a digitially controlled circuit that does not use chopper techniques and that exceeds in efficiency these limitations. We have achieved an efficiency higher than ninety-five percent.

BRIEF SUMMARY OF THE INVENTION

For low vehicle speed (for example, up to ten miles per hour) our control system controls the battery voltage of the current to the motor while maintaining a low gear ratio. For higher speeds the battery voltage remains constant and the transmission gear ratio is changed. The basic command signals are delivered by the accelerator in digital form to the control circuit. We presently prefer a four-bit binary code wherein the lower coded numbers control battery taps that control the motor input voltages up to ten miles per hour. The higher coded numbers from the accelerator switch are compared to the gear ratio number from the continuously variable transmission. If the demand number is greater than the transmission gear ratio number, the gear ratio actuator will be energized to obtain a higher gear ratio. If the demand number from the accelerator is lower than the transmission number, the gear ratio actuator will be energized to a lower gear ratio. If the two numbers are equal, the gear ratio will not be changed.

We also have an electrical signal generated when the motor rpm reaches a predetermined maximum, and we have a second signal generated when the motor current reaches a predetermined maximum. In the first instance (rpm), this signal energizes the gear shift actuator to a higher gear ratio, and this change will reduce the motor rpm, whereupon the signal will cease and the gear shifting will cease. In the second instance (motor current), the signal energizes the gear shift actuator to a lower gear ratio, whereupon the drive current will decrease, the signal will cease, and the gear shifting will cease.

Regenerative braking is employed and is switched on by lifting the foot from the accelerator or depressing the brake pedal. Mechanical brakes are applied with additional pedal force.

Our system does not chop or otherwise directly control either armature or field current. Instead, we control vehicle speed above ten miles per hour by automatically changing the gear ratio of the transmission and while maintaining a free flow of current from constant voltage batteries.

While our digital system may be used on a large variety of vehicles, it will be disclosed, for illustrative purposes only, as applied to a three-wheeled commuter passenger vehicle designed for optimum handling characteristics and minimum aerodynamic drag. This vehicle uses two front steerable wheels and a single driven wheel disposed at the rear. A direct current motor drives the rear wheel through a continuously variable transmission, which may be of the type employing a V-belt disposed on pulleys whose conical sheaves move closer or farther apart to achieve a larger pulley diameter and a smaller pulley diameter, respectively. Any other suitable transmission could be employed. Power for the motor is obtained by rechargeable batteries mounted ahead of or closely adjacent to the two front wheels. The passenger area is disposed between the front wheels and the rear wheel. Preferably, each wheel carries approximately the same amount of weight.

Various objects, advantages, and features of the invention will be apparent in the following description and claims, considered together with the drawings forming an integral part of this specification and in which:

FIG. 3A is a simplified block diagram of our control circuit for the vehicle.

FIG. 3D is a circuit diagram of the motor voltage control of FIGS. 3A and 3B.

Figure 1:
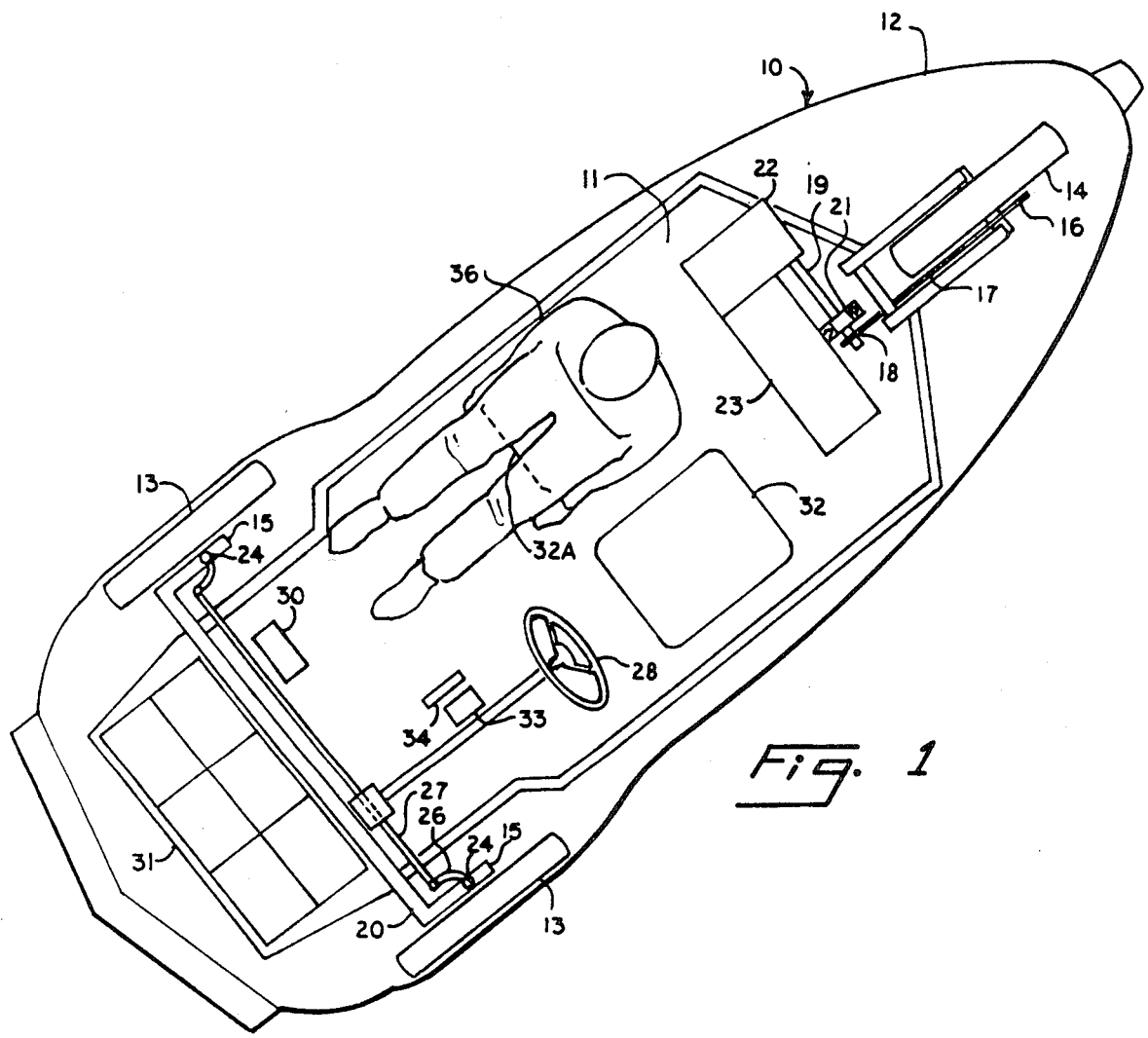
FIG. 1 is a plan view of a three-wheeled vehicle employing the control system of the invention.

FIG. 3F 1 is a circuit diagram of the regenerative braking initiated by the operator pressing on the brake pedal.

Figure 2:
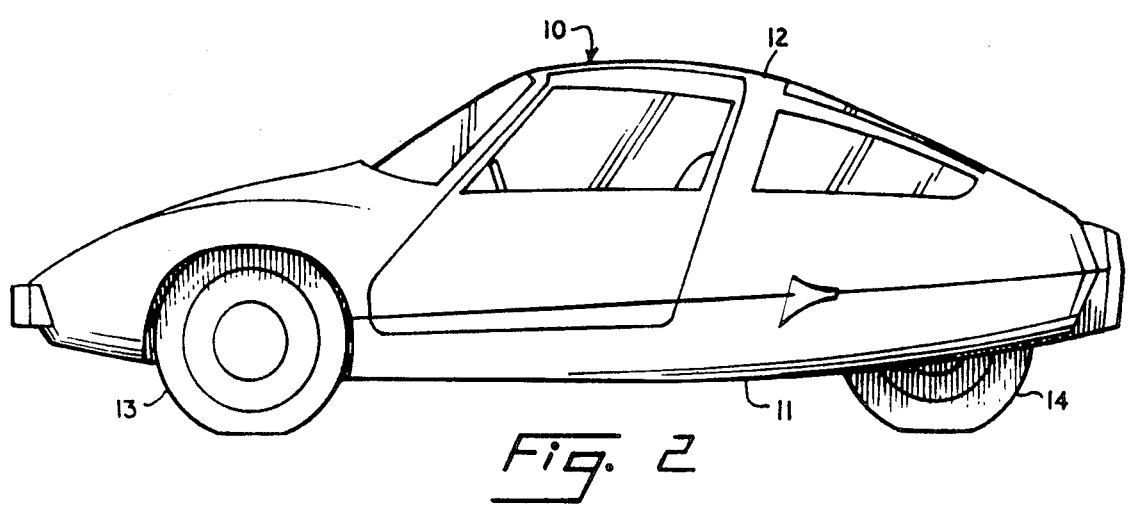
FIG. 2 is an elevation view on a reduced scale of the vehicle of FIG. 1.

FIG. 3F 2 is a circuit diagram of the motor rpm protective circuit.

FIG. 3F 3 is a circuit diagram of maximum drive motor current protection circuit.

FIG. 3F 4 is a circuit diagram of the coasting regenerative braking initiated by the operator lifting up on the accelerator pedal and without pressing on the brake pedal.

FIG. 3G is a circuit diagram that effects priority control for the different functions and that energize the transmission actuator to effect vehicle control by varying the transmission gear ratio.

Referring to FIGS. 1 and 2, there is illustrated an electric passenger vehicle 10 having a frame 11 preferably in the form of a continuous belly pan, also preferably of honeycomb construction for maximum strength with minimum weight. Disposed on the frame 11 may be an exterior shell 12, preferably of tapering shape in the rear for minimum aerodynamic drag and preferably of low vertical profile for minimum aerodynamic drag.

The vehicle is supported by a pair of steerable front wheels 13 secured to trailing arms 15, which in turn are secured to a transverse torsion bar 20. The wheels are mounted on kingpins 24 and are steered by means of arms 26, secured to a transverse steering rod 27 actuated by a steering wheel 28 in conventional fashion.

The rear wheel suspension is a trailing arm with a spring and a shock absorber on each side. The rear of the vehicle is supported on a single wheel 14 driven by a sprocket 16, which in turn is engaged by a chain 17, the other end of which is driven by a small-sized sprocket 18 mounted on a shaft 19 supported in a bearing 21. The shaft 19 is the output shaft of a transmission 22, preferably of the continuously adjustable type, and this transmission in turn is driven by an electric motor 23.

Power for the electric motor 23 is obtained from a bank of batteries 31 connected by wires, not shown, to a relay box 30, which is connected by wires, not shown, to the motor 23. The batteries 31 are preferably disposed forward of the axis of the front wheels 13, but additionally or alternatively may be placed on the longitudinal axis of the vehicle adjacent to the legs of a passenger 36. The driver of the vehicle may be seated on a seat 32 so that he may grasp the steering wheel 28 and operate a brake pedal 33 or alternatively an accelerator pedal 34. The brake pedal and accelerator pedal are connected to the controller circuit, as will be described hereinafter. We prefer that the rear wheel 14 be of greater transverse dimension than the front wheels 13 so that the total area of the rear wheel 14 in contact with the pavement is equal to the areas of the two front wheels 13 in contact with the pavement. When the vehicle is fully loaded with two passengers, the location of the components, principally the batteries and the motor and transmission, is such that there is an equal load on each of the three wheels. A passenger 36 may be disposed on a passenger cushion 32a.

The mechanical structure of the vehicle provides safety features in that the forward mounted batteries are at the greatest possible distance from the passengers. In a front-end collision any acid due to its momentum will move forward away from the passengers. Any splashback may be stopped by a firewall. The batteries also act as a crushable material which reduces the deceleration of the passengers in a frontal impact. The smooth belly pan structure gives maximum smoothness for minimum air resistance and may be located at or below the axis of the front wheels 13. The torsion bar mounting of the front wheels gives improved comfort compared to normal suspensions and allows the driver and passenger to be located farther forward due to its short longitudinal dimension. The equal weight on all wheels aids in cornering performance.

ILLUSTRATIVE CIRCUIT

Shown in FIGS. 3A to 3G is one form of structure that performs the various functions that control the vehicle, although various other circuits and electric and electronic elements can be used.

Referring to FIG. 3A there is illustrated in a simplified block diagram the basic control of the vehicle speed by varying just two elements, the motor voltage and the gear ratio of the transmission. Our electric car controller system is a dead band servo system whose primary mode is to control vehicle speed by signals from the accelerator signal generator 41. Speed is controlled by changing the gear ratio of the variable transmission 22. Supplementary modes of control include the brake mode and motor protection mode. The brake mode includes the regenerative braking mode commanded by a brake switch, and the coasting regenerative braking commanded to "ON" when the motor voltage (acting as a generator) is greater than 36 volts and the brake switch is not closed.

Referring to FIG. 3A an operator presses his foot on accelerator 34 connected to an accelerator signal generator 41 which delivers binary signals to a motor voltage control 80 and to a gear ratio control 81. The motor voltage control 81 controls the voltage from a bank of batteries (not shown), to the motor 23 which in turn drives the transmission 22. The gear ratio control command is delivered by wires 82 to the transmission 22 to vary the ratio by actuators (not shown), and wires 83 feed back to the gear ratio control 81 the instantaneous gear ratio to stop the ratio changing when the desired gear ratio is achieved.

The subsidiary modes are represented by box 84 in FIG. 3A. The motor protection mode includes over-current protection and over-speed protection. These two items of information are delivered by the motor 23 through wires 86 to box 84. When the forward motor current is greater than an internal standard referred to as the "motor current maximum reference", circuitry is activated to reduce the forward current to the motor 23. When the motor speed is greater than an internal standard referred to as the "maximum motor speed reference" circuitry is activated to reduce the motor speed. These two subsidiary modes change the gear ratio by signals from box 84 through conductors 87 to the gear ratio controller 81.

Figure 3B:
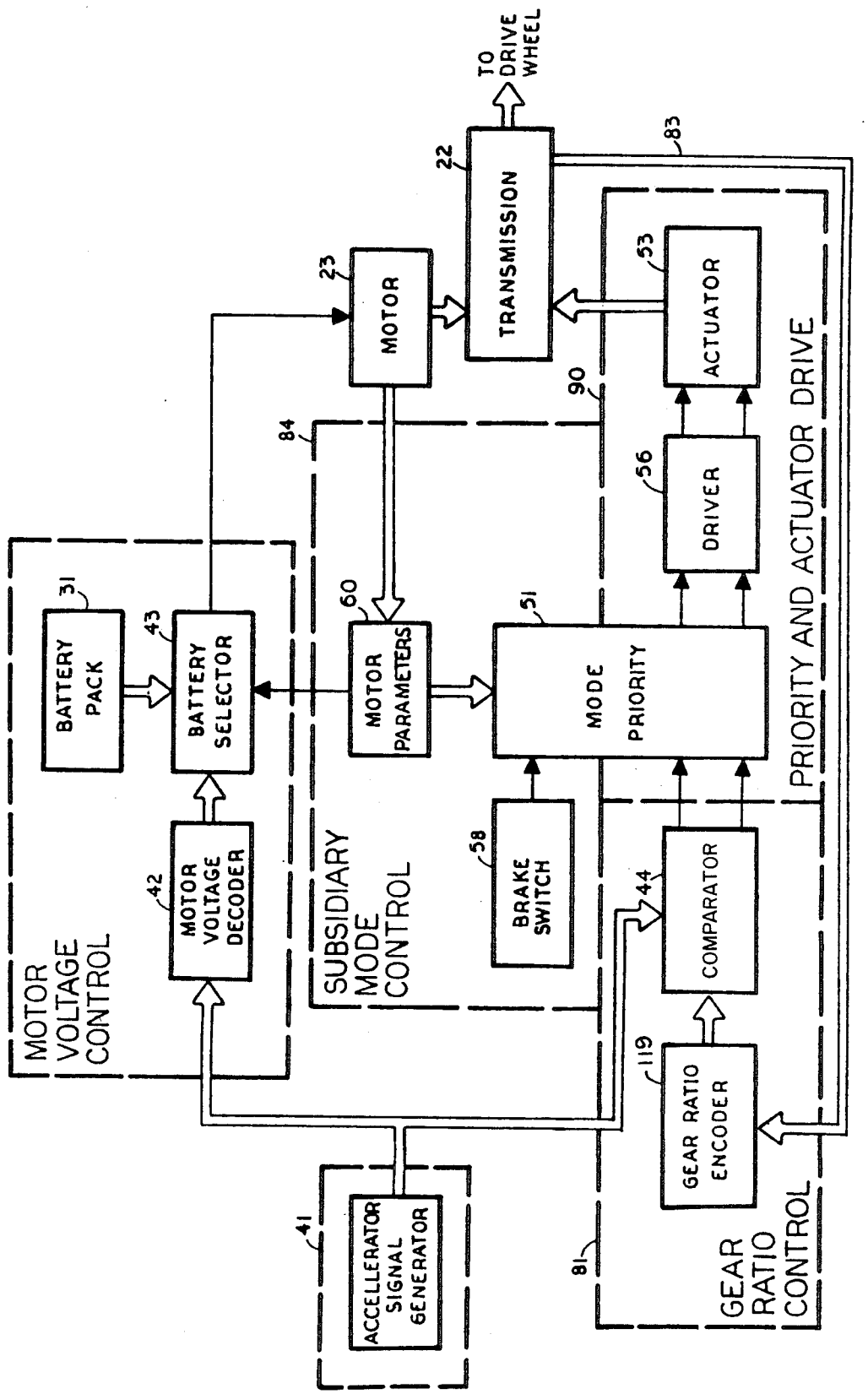
FIG. 3B is a functional block diagram adding more details to the diagram of FIG. 3A.

Referring still to FIG. 3A and box 84 the subsidiary mode of regenerative braking is also illustrated. This mode is operative when a signal is transmitted from box 84 through conductor 87 to the motor voltage control box 80. The details of this mode are described with reference to FIG. 3B.

Illustrated in FIG. 3B are the blocks of FIG. 3A in broken outline. Disposed within each major block are subsidiary solid blocks representing further apparatus and circuits to carry out the functions. There is added in FIG. 3B a box 90 that is not present in FIG. 3A and this box is labeled Priority And Actuator Drive. Disposed within box 90 is box 51 labeled Mode Priority.

The accelerator signal generator 41 delivers binary numbers to a decoder 42 that controls motor voltage. Decoder 42 responds to six levels of accelerator numbers to control a battery selector 43 that progressively connects six batteries in battery pack 31 to the motors 23 to vary the motor voltage from zero to 36 volts in 6-volt steps. As the accelerator 34 is progressively depressed, block 41 generates the 4-bit number code.

Shown in FIG. 3B in box 84 is a brake switch shown as box 58. When the operator presses on brake pedal 33 (FIG. 1), the brake switch 58 is closed, sending a signal to the mode priority box 51. It in turn sends a signal to driver box 56, which controls an actuator 53 that shifts the transmission 22 to a higher or lower gear ratio to control regeneration current.

The transmission 22 sends instantaneous gear ratio signals over the wires 83 to an encoder 119 that converts them to binary form. A comparator 44 compares the binary numbers from the accelerator generator 41 and encoder 119 and delivers its output to the mode priority box 51. The motor 23 delivers its instantaneous condition of current (either driving or regenerative), voltage and rpm to a motor parameters box 60 that delivers this information also to the mode priority box 51.

The mode priority box 51 delivers a two-bit binary signal to the driver 56 and establishes the priority of the different modes of operation inasmuch as only one mode can be operating at any one time. This priority is shown on Table A.

TABLE A
MODE PRIORITY

| Priority | Mode | Condition | Commands to Actuator Driver 56 |
|---|---|---|---|
| 1 | Regenerative | $I_{Brake} > I_{Ref}$ & Brake Sw. ON | 10 |
| 1 | Braking | $I_{Brake} < I_{Ref}$ & Brake Sw. ON | 01 |
| 2 | Over Current Protect | $I_{Forward} > I_{Ref}$ | 10 |
| 2 | Motor Speed Protect | Motor rpm > Motor rpm Ref. | 01 |
| 3 | Normal Speed | Accelerator No. > Trans. No. | 01 |
| 3 | Control | Trans. No. > Accelerator No. | 10 |
| 4 | Coasting | $I_{Brake} > I_{Coasting\ Ref}$ | 01 |
| 4 | Braking | $I_{Brake} < I_{Coasting\ Ref}$ | 10 |

10 Commands Lower Gear Ratio
01 Commands Higher Gear Ratio
00 No action
11 No action The normal speed control mode, priority three of Table A, is by two stages, both controlled by the four-bit word or code from the accelerator signal generator 41. The first stage is variable voltage from 0 to 36, and the second stage is control of the transmission. The motor voltage is controlled with a set of relays which progressively switch six batteries in pack 31 to the motor 23, and these relays hold this maximum voltage on the motor as the accelerator 34 is further depressed by the operator. This four-bit number code and the effect on motor voltage is shown in Table B.

The second stage takes place after the motor is connected to full voltage, and the operator depresses the accelerator further. This second stage is control of vehicle speed by changing the gear ratio. Then the comparator 44 sends a signal through the mode priority 51 to the driver 56 to energize the actuator 53 to shift the gear ratio higher for higher speed and lower for lower speeds.

TABLE B
CONTROL OF MOTOR VOLTAGE AND GEAR RATIO FROM ACCELERATOR PEDAL

| Decimal Value | Binary | Battery Voltage Select | Transmission Gear Select |
|---|---|---|---|
| 0 | 0000 | 0 V | 0 |
| 1 | 0001 | 0 V | 0 |
| 2 | 0010 | 0 V | 0 |
| 3 | 0011 | 6 V | 0 |
| 4 | 0100 | 12 V | 0 |
| 5 | 0101 | 18 V | 0 |
| 6 | 0110 | 24 V | 0 |
| 7 | 0111 | 30 V | 0 |
| 8 | 1000 | 36 V | 0 |
| 9 | 1001 | 36 V | 1 |
| 10 | 1010 | 36 V | 2 |
| 11 | 1011 | 36 V | 3 |
| 12 | 1100 | 36 V | 4 |
| 13 | 1101 | 36 V | 5 |
| 14 | 1110 | 36 V | 6 |
| 15 | 1111 | 36 V | 7 |

From the foregoing Table B, it will be noted that we prefer an initial lost motion of accelerator movement for easier operator control. Thereafter increasing voltage is applied while the transmission remains in its lowest or zero ratio. Once full voltage is applied, further depressing the accelerator causes increasing gear ratios, up to ratio 7 when maximum vehicle speed is achieved on level terrain.

During special circumstances, however, the subsidiary modes are called upon. The two broad modes, motor protection and regenerative braking, compete with the normal mode at the actuator driver 56 of FIG. 3B through the mode priority circuit 51. The priority circuit 51 selects the correct mode as shown in Table A, and passes its signal through the driver 56 to the actuator to effect a gear ratio change in the transmission 22.

MOTOR VOLTAGE CONTROL

Figure 3C:
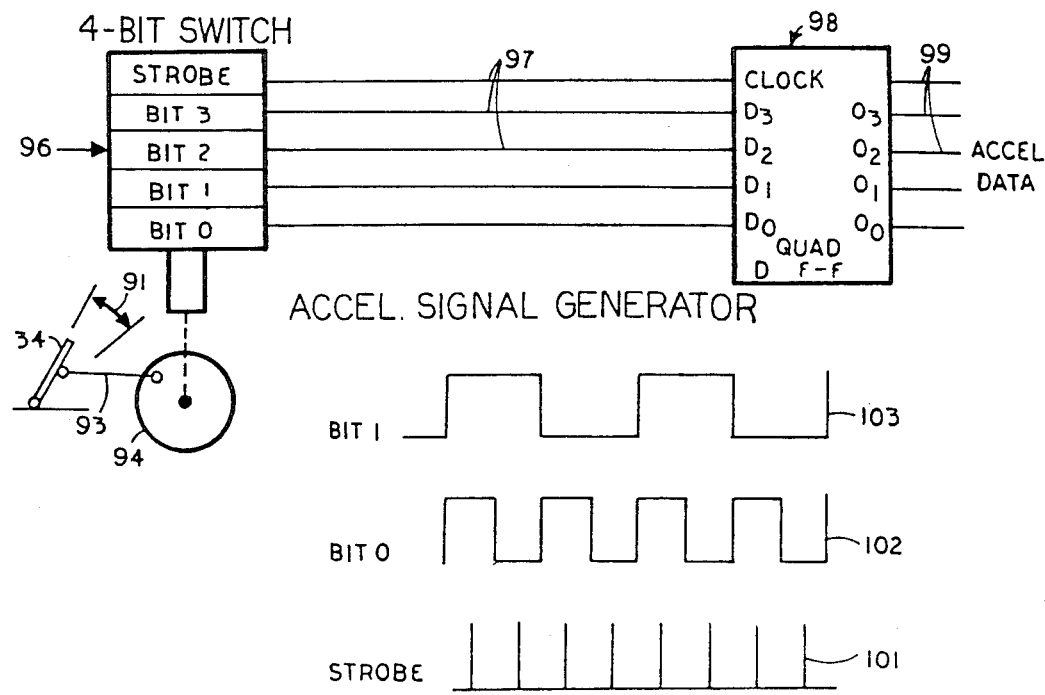
FIG. 3C is a circuit diagram, with wave forms, of the accelerator signal generator of FIGS. 3A and 3B.

Referring to FIG. 3C there is illustrated apparatus of the accelerator signal generator 41 for generating the 4 bit binary signals dependent upon the operator's foot moving the accelerator 34 through an angle 91. The accelerator pedal 34 is connected by a link 93 to a wheel 94 that is rotated by the pedal 34 to rotate the shaft of a 4 bit switch 96 having five decks: Bit zero to Bit three generators and a strobe. The four bit code from switch 96 is latched at the "D" flip-flop 98 output when the leading edge of the strobe output appears at the clock input. The latch circuit of flip-flop 98 passes data (zero or one) only when the latch changes state from a low to a high, and is primarily a device to reduce the electronic noise from the 4 bit switch 96. The output of "D+ flip-flop 98 is delivered through wires 99 to the motor voltage decoder 42 and the comparator 44 as described in connection with FIG. 3B. The quad D flip-flop may be in the form of a conventional chip number 74175.

An example of output from the 4 bit switch 96 is shown in FIG. 3C when the accelerator 34 is depressed at an angle that actuates only "Bit 0" and "Bit 1", the strobe angle is reached, and the flip-flop delivers its outputs. In this example the strobe output is line 101, the "Bit 0" output is line 102 and "Bit 1" output is line 103.

Referring to FIG. 3D there is illustrated the motor voltage decoder 42 and apparatus for the battery selector 43 of FIG. 3B. Three of the four wires 99 from the "D" flip-flop 98 of FIG. 3C deliver their output to a conventional decoder 42 and the fourth wire 99 delivers its signal to an AND gate or circuit 105. As shown in Table B, accelerator angles corresponding to decimals 0 to 2 do not cause the motor to start. Accelerator angle 4, decimal 3, generates binary 0011 which is decoded at 42 to transmit a signal to AND gate 104 which signals a power transistor 106 to pass current through a relay coil 107 to close relay switch 108 which connects the 6 volt tap or terminal of battery pack 31 via motor switch 50 to the motor 23. In a similar fashion the higher binary codes act through AND gates or circuits and relays to successively connect battery taps in 6 volt increments to the motor until all six of the batteries are connected to apply 36 volts to the motor, which is maximum voltage. The top line 99 responds to the most significant bit of binary 1xxx to close the 36 v tap. As previously described, once the maximum voltage is applied, control thereafter is obtained by varying the ratio in transmission 22. The decoder 42 may be in the form of an off-the-shelf chip number 74138.

Interposed between the battery 31 and the motor is a manual switch 50 for OFF-ON and REVERSE.

The decoder 42 is a 3 to 8 decoder which means that signals come in on three wires and the decoder has 8 outputs. Off-the-shelf chip number 74138 can be used for decoder 42.

If two relays were closed at the same time, a short circuit would result, and a fuse whould blow. To eliminate this possibility, we provide a relay blanking circuit 111, 112 and 113 that disables all of the power transistors for a short time, (about 10 milliseconds) when the battery relay commands change. This circuit generates a blanking pulse of the desired duration when the least significant bit of the accelerator generator 41 changes from a "zero" to a "one" or from a "one" to a "zero". This logic is sufficient since the data from the accelerator is mechanically constrained to produce an up or down counting sequence. This fact requires the least significant bit to change whenever accelerator data changes. The blanking circuit causes the least significant bit of the coded accelerator signal to drive the positive input to one shot multivibrator 111, and to drive the negative input of one shot multivibrator 112. The pulse control outputs of one shots 111 and 112 are combined in OR circuit 113. The output of OR circuit, which produces a negative pulse of duration T when the least significant bits of the accelerator data changes, drives each of 6 AND gates 104 and relay transistors 106. This circuit allows the last relay to open before the next relay closes. The time, T, is equal to the greatest transition time of the 6 relays.

Referring still to FIG. 3D, during regenerative braking, the circuit between battery pack 31 and the motor 23 must remain connected even though the operator lifts his foot off of the accelerator which would normally disconnect the motor and batteries. However, this regeneration connection of 36 volts can only be productive if the motor 23 acting as a generator produces a voltage greater than the battery voltage. Connected to OR circuit 114 is a voltage sensor 60 for charging voltages, and only when this charging voltage is greater than battery voltage (36 volts) will the brake signal from brake 58 be passed to the OR circuit 114. If the operator presses on brake 33 (FIG. 1) this closes the brake switch 58 and if the generated voltage exceeds 36 volts, this energizes OR circuit 114, to energize transistor 116 and relay coil 117 to close relay switch 118, which connects the 36 volt battery tap to the motor 23. If the vehicle is moving faster than about 10 mph the motor will generate a current that charges battery 31 causing the vehicle to slow down.

GEAR RATIO SELECTION

Figure 3E:
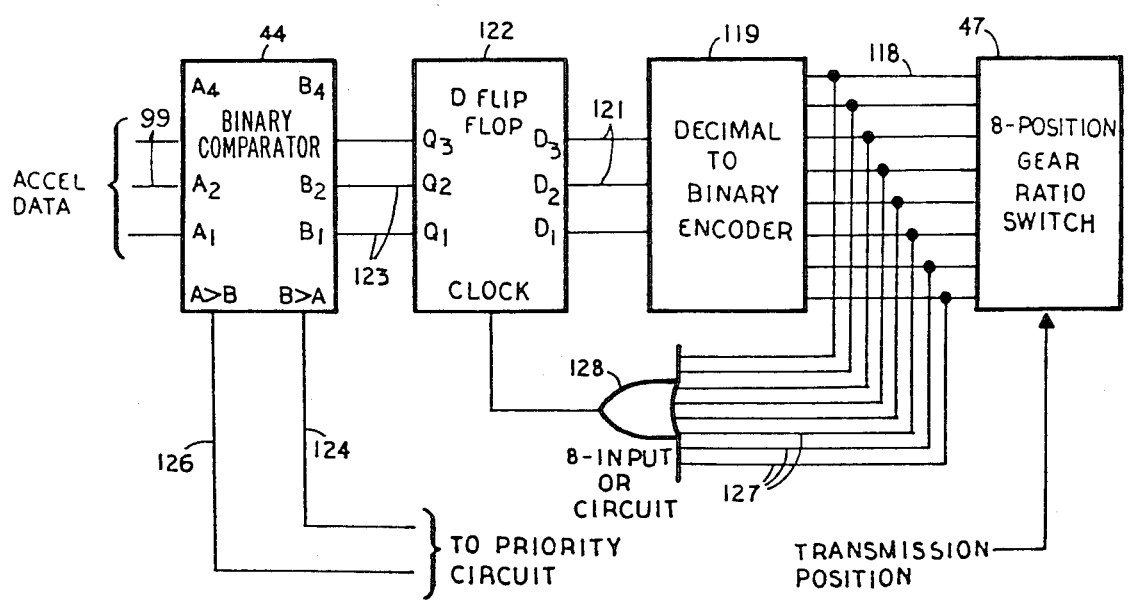
FIG. 3E is a circuit diagram of the gear ratio control of FIGS. 3A and 3B.
Figure 30:
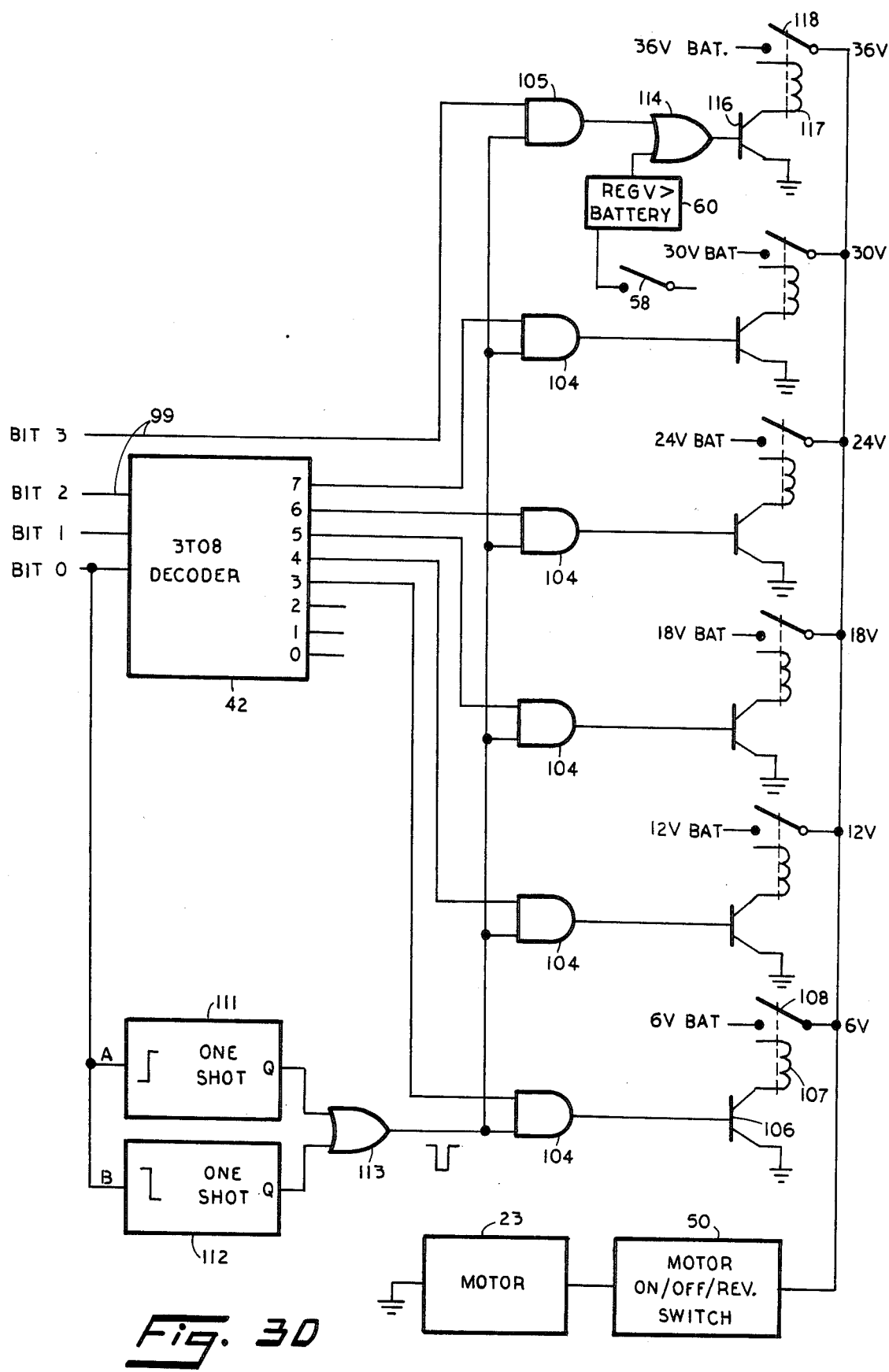

The apparatus whereby the gear ratio is selected by the accelerator signal generator 41 of FIGS. 3B and 3C is shown in FIG. 3E. Shown in Table B is the relationship of accelerator angle (decimal numbers) to the gear ratio, and it is only after decimal 8 that the transmission shifts out of its lowest or zero gear ratio. If the operator lifts his foot so that there is a lesser accelerator number, then the apparatus of FIG. 3E causes a down shifting of the transmission.

The change in gear ratio of the transmission mechanically drives a gear ratio switch or signal generator 47 that transmits in decimal form any one of its 8 gear ratios by wires 118 to an encoder 119 which translates the decimal of the gear ratio (right hand column of Table B) to the corresponding binary number of Table B. This encoder output is delivered by wires 121 to a 3D flip-flop circuit 122 to clean up the electronic noise, and its output is delivered by wires 123, to a binary comparator 44 which can also be referred to as a high number comparator. Comparator 44 also receives by the lower three wires 99 of the quad D flip-flop 98 (FIG. 3C), the binary output of the accelerator signal generator 98 of FIG. 3C. The two sets of binary numbers are compared in 44 and the output is delivered over wires 124 and 126 to the mode priority circuit 51 (FIG. 3B). If the accelerator number is greater than the transmission number, then the signal goes over wire 126 and if less, then the signal goes over wire 124. If the priority is correct at 51 then these signals cause the actuator 55 (FIG. 3B) to shift the transmission 22 to a higher or lower gear ratio.

Branching from the gear ratio wires 118 are wires 127 delivering signals to an OR circuit 128 which in turn delivers its strobe signals to the clock portion of flip-flop 122. The 8 to 3 encoder 119 may be in the form of off-the-shelf chip 74148.

BRAKE PEDAL REGENERATION BRAKING

Shown in FIG. 3F 1 is a circuit that controls brake regeneration within a current maximum and a current minimum. If the regeneration current is too high the motor must be up shifted to reduce the current. If the regeneration current is too low, the motor must be down shifted to produce more braking. If the brake switch 58 is closed when the vehicle is moving slowly, (below about 10 mph) the motor 23 acting as a generator will not produce a voltage as high as the 36 volts of the battery pack 31. In this case there could be no battery charging and therefore no regenerative braking.

A circuit for maintaining brake pedal regeneration current within these current and voltage limits is illustrated in FIG. 3F 1. Disposed within the motor parameters measurements 60 of FIG. 3B is a regenerative current sensor 65 having a voltage output. This output is delivered to two comparators 140 and 141 which also receive inputs from a minimum current reference 142 and a maximum current reference 143 respectively, and both references are in the form of voltages.

The outputs of comparators 140 and 141 are delivered to AND circuits 144 and 146 respectively, which receive a signal only when the brake switch 58 is closed. Also connected to AND circuits 144 and 146 is the output of a sensor 60 for charging voltage and it delivers a signal to the AND circuits 144 and 146 only when the charging voltage exceeds maximum battery voltage. When the AND circuits, 144 and 146 receive signals from both switch 58 and sensor 60, then they respond to the current signal from 65 reaching the maximums and minimums. These AND circuits deliver their signals over wires 147 and 148 to the mode priority circuit 51. If the brake current is below minimum a signal is delivered over wire 147 to the mode priority 51 which commands a lower gear ratio. If the brake current is greater than the maximum reference a signal is delivered through the mode priority 51 to shift the transmission to higher gear ratio so that less current will be generated.

MOTOR SPEED PROTECTION

Shown in FIG. 3F-2 is a one level comparator circuit for impressing a signal on the mode priority circuit 51 whenever the motor rpm becomes excessive. In such an event the transmission is caused to up shift so that the motor slows its speed. The motor 23 is connected to a tachometer 150 that produces a voltage proportional to motor rpm. A voltage reference 151 is provided having a voltage output the same as that produced by the tachometer 150 at the maximum desired rpm. Both outputs are delivered to a comparator 152 and when the tachometer voltage exceeds the reference, a signal is delivered to a wire 153 which is connected to the mode priority circuit 51 of FIG. 3B. If the priority is correct the signal on wire 153 causes the transmission actuator 53 to up shift the transmission gear ratio. In this fashion the motor 23 is protected from excessive rotary speeds.

MOTOR DRIVE CURRENT PROTECTION

If the motor 23 draws too much current it becomes hot and may burn out. This condition is corrected by providing a signal that will shift the transmission to a lower gear ratio where the motor rotates at a higher speed and therefore draws a lesser current.

A circuit shown in FIG. 3F 3 is used to generate a signal when the motor current exceeds a predetermined maximum. A motor current meter 59 having a voltage output, and a current standard 154 having a voltage output are both connected to a comparator 156. The comparator 156 of FIG. 3F 3 will send a signal over wire 157 when this current maximum is exceeded, which is delivered to the priority encoder 51 of FIG. 3B. If the priority is correct, then as shown in Table A, this over current signal will pass through the priority encoder to the driver 56 of FIG. 3B to cause the actuator 53 to shift the transmission to a lower gear ratio at which less current will be consumed by the motor for the same power output.

COASTING REGENERATIVE BRAKING

Shown in FIG. 3F-4 is a circuit that generates shifting of the transmission for regenerative braking when the operator lifts his foot off of the accelerator, or lets up on the accelerator and the brake pedal is not depressed. The usual driving habit is to reduce speed gradually when brake pedal braking is not desired. With vehicles with internal combustion engines this is generally referred to as compression braking. The circuit of FIG. 3F-4 simulates this more gentle braking under coasting conditions, and is similar to the circuit of FIG. 3F-1 except for the maximum and minimum references.

The current sensor 65 located in the motor parameters group of box 60 of FIG. 3B delivers a voltage signal to comparators 158 and 159 which also receive a maximum current reference voltage from source 161 and a minimum current reference voltage from a source 162, respectively. The outputs are delivered to AND circuits 163 and 164 respectively which also receive a signal from a charging voltage sensor 60 which delivers a signal only if the charging voltage is above battery maximum of 36 volts. If the charging voltage is below battery voltage then no regenerative braking takes place. Brake switch 58 is also connected to the two AND circuits 163 and 164 and during coasting regenerating this brake switch is open as previously stated. If the brake switch is closed then the AND 163 and 164 circuits are inactive and no signal is delivered out of their wires 166 and 167 respectively. If sensor 65 delivers a voltage greater than reference 161 then a signal is delivered to wire 166 leading to mode priority 51 and if the priority is correct the signal is passed to the driver 56 to energize actuator 53 to shift the transmission 22.

If sensor 65 delivers a voltage less than reference 162 than a signal is delivered over wire 167 to mode priority 51 and if the priority is correct than the signal is passed to driver 56 to energize actuator 53 to shift the transmission 22.

Because we desire to make coasting regenerative braking less severe than brake pedal regeneration, the reference voltages of 161 and 162 are less than the reference voltages from 142 and 143 of FIG. 3F 1.

PRIORITY CONTROL

Illustrated in FIG. 3G is the operation of the priority and actuator part 90 (FIG. 3B) of the system. As conditions change, the mode of the control system must change. For example, if the brake is applied and the brake switch 58 is ON, then the control system must be in the regenerative mode. Equally important, the transmission control by the accelerator must be rendered inoperative. The various functional modes and their priorities are listed in Table A.

Since only one mode can be operating at any one time the circuit of FIG. 3G selects the priority of the functions listed in Table A (individually or simultaneously) and appropriately responds with a command for the transmission shifting. The eight inputs are from the various circuits already described; 147 and 148 from FIG. 3F-1, 153 from FIG. 3F-2, 157 from FIG. 3F-3, 126 and 124 from FIG. 3E, and 166 and 167 from FIG. 3F-4. The system delivers the eight labeled inputs to a priority encoder 51A which can be an off-the-shelf chip made by several manufacturers bearing number 74138. The chip 51A outputs a 3 binary code to a binary-to-decimal decoder 51B which may be an off-the-shelf chip made by several manufacturers bearing number 74185.

The decoder 51B performs two functions:
(1) decodes the 3 bit input to one of 8 output lines, and
(2) sets an output line in response to the largest input number. The highest priority number is delivered by encoder 51A over three wires to decoder 51B and which decodes it and sets one of 8 output lines according to the priority number. Each of 8 output priority lines from 51B goes to one of two OR circuits 130 and 131. These two OR circuits drive the relay circuits (that operate an actuator motor 53) to one of the three relay configurations, 1. higher gear,
2. lower gear,
3. no change.

The output of OR circuit 130 is delivered to an AND circuit 132, which is connected to a high gear limit switch 133 which is mechanically operated by the transmission when it is shifted to its highest or 7 position. The output of OR circuit 131 is connected to an AND circuit 134 which is connected to a low gear limit switch 136 which is mechanically operated by the transmission when it reaches the lowest, or zero ratio. These limit switches stop the actuator motor 53 when either limit is reached.

The output of AND circuit 134 is delivered to a transister 138 which delivers current to a relay coil 56A that controls a relay switch armature 56B. In the position shown, both relays 52 and 56 are connected to 12 volts and no current flows through the motor 53. If the relay switch armature 56B is on 0 volts then the motor 53 rotates in one direction and if the relay armature 52B is on zero volts, then the motor 53 will rotate in the opposite direction, shifting the transmission 22 up or down.

CHIP SCHEDULE

While variously numbered chips will carry out the functions described, we presently prefer the following chips made by several different manufacturers:

| FIG. 3C | quad D flip-flop | 98 | No. 74175 |
| FIG. 3D | 3 to 8 decoder | 42 | No. 74138 |
| | multivibrator | 111 | No. 74123 |
| | multivibrator | 112 | No. 74123 |
| FIG. 3E | binary compare | 44 | No. 54S85 |
| | 4 D flip-flop* | 122 | No. 74175 |
| | decoder | 119 | No. 74148 |
| FIG. 3G | priority decoder | 51A | No. 74148 |
| | decoder | 51B | No. 74138 |

*The quad D flip-flop 122 operates as a 3 D flip-flop because one channel is not used.

OPERATION

The basic operation is illustrated in FIG. 3B. The operator pushing on the accelerator generates a 4 bit binary code as shown in Table B (on page 13) and the first 8 angles of accelerator depression are decimals 0 to 8. The corresponding binary numbers are decoded to 42 to command the battery selector 43 to successively connect the taps of battery 31 in 6 volt increments to the battery maximum of 36 volts shown by decimal 8 in Table B. All during this progression from decimal 0 through 8 the transmission remains in its lowest or zero gear ratio as shown by the right hand column of Table B. The control of motor speed for these decimals 0 to 8 is entirely by increasing the voltage applied to the motor 23.

Starting with decimal 9 of Table B the four bit binary code is received by comparator 44 the decoder 42 is unable to respond to these higher binary codes. The comparator 44 receives signals from the transmission 22 via encoder 119 as to which of its 8 gear ratios is in effect at the moment. If the accelerator number is higher than the gear ratio number, comparator 44 passes a signal to mode priority 51 and if the priority is correct, then it passes to driver 56 to energize the actuator 53 to shift the transmission to a ratio of a number that will equal the accelerator number from 41. If the accelerator number is lower from 41, then the comparator passes a signal to mode priority 51, and if the priority is correct, to the driver 56 to shift the transmission in the opposite direction until its gear ratio number equals that of the accelerator number.

DETAILED OPERATION

The generation of accelerator numbers is shown in FIG. 3C wherein 4 bit switch 96 generates the 4 bit code of Table B. Flip-flop 98 clears up the electronic noise and passes the binary code by wires 99 to the circuit of FIG. 3D and to the circuit of FIG. 3E.

Referring to FIG. 3D the binary code of Table B is decoded by 42 to 5 outputs that act through AND circuits 104 to successively connect 6 volt taps until 30 volts are connected. The top wire 99 connects the last, or 36 volt, tap. This is a circuit that increases vehicle speed by connecting the motor to successively higher voltages while still in the lowest gear ratio and decreases speed in the same fashion.

Referring to FIG. 3E gear shifting is effected by binary codes higher than decimal 8 of Table B and these are inputed to comparator 44 which also receives binary numbers codes representing the 8 gear ratios of the transmission from switch 47. If the binary code from the transmission is higher than the binary code from comparator 44, then a signal goes over wire 124 to shift to a lower gear.

Regenerative braking is accomplished as shown in the upper part of FIG. 3D when the operator closes brake switch 58. If the vehicle speed is sufficiently high so that the motor acting as a generator reaches 36 volts, then box 60 passes the signal from switch 58 to OR circuit 114 to close relay armature 118 to connect the motor to 36 volts so that charging the batteries 31 will brake the vehicle.

Referring to FIG. 3F 1 the regenerative current is held to a maximum by reference 142 delivering its output to comparator 140 and if the motor current sensed by 65 is greater, a signal goes over wire 147 to shift the transmission. If the signal from 65 is less than reference 143 then a signal goes over wire 148 to shift the transmission to increase generated current.

The circuit of FIG. 3F 2 signals the transmission actuator if motor rpm is excessive and the circuit of FIG. 3F 3 signals the transmission actuator if motor current is excessive.

The circuit of FIG. 3F 4 uses lower reference signals than FIG. 3F 1 to effect coasting braking and otherwise acts similarly to FIG. 3F 1.

Inasmuch as only one mode of operation can occur at any one time, the circuit of FIG. 3G establishes the priority of the various signals inputting to the priority encoder 51A at its left side, and these signals cause transmission shifting as shown in Table A. If the brake is applied then signals from wires 147 and 148 have priority over all other signals and excessive brake regeneration current has priority over brake current that is less than reference. Similarly motor speed from wire 153 and motor current from wire 157 have priority over the normal accelerator control signals on wires 126 and 124. Coasting regeneration has the lowest priority, producing signals on wires 166 and 167.

If the operator has the vehicle up to a high speed and lifts his foot completely off of the accelerator 34 of FIG. 3A then the low numbers generated at 41 will be delivered to comparator 44 (FIGS. 3B and 3E) and being lower than the transmission numbers, the comparator 44 sends a signal through 51A to the actuator driver 56, to cause the down shifting of the transmission. The right hand column of Table B shows that the transmission will down shift from 7 to 1 and thereafter the battery taps will be disconnected down to decimal 0 at which there is zero volts on the motor. If the operator applies the brake pedal 33 of FIG. 1, this closes switch 58 and as shown in the upper part of FIG. 3D, this will connect the 36 volt tap to the motor 23 if the generated voltage of motor 23 exceeds 36 volts. This regenerative current will charge batteries 31 causing the vehicle to slow down.

We have described our invention with respect to a presently preferred embodiment as required by the statutes. Various modifications, variations and improvements will occur to those skilled in the art, and all of these that come within the true spirit and scope of the invention are included within the scope of the following claims.

We claim:

1. A control system for a vehicle controlled by an operator-movable accelerator movable through a range of distance from a rest position to a full power position, said vehicle being driven by a rotary electric motor through a variable transmission variable from a high gear ratio to a low gear ratio, said vehicle having a plurality of batteries, comprising:
   (a) accelerator means for generating digital signals of progressive numbers dependent upon the position of the accelerator in its range;
   (b) transmission means for generating digital signals of progressive numbers dependent upon the gear ratio of the transmission;
   (c) a transmission actuator for changing the transmission to a higher or lower gear ratio;
   (d) a comparator connected to the actuator and to the accelerator means and the transmission means to compare the signals from the accelerator means and the transmission means to operate the transmission actuator to a higher gear ratio when the accelerator number exceeds the transmission number and to operate the transmission actuator to a lower gear ratio when the transmission number exceeds the accelerator number,
   (e) and switching means responsive to positions of said accelerator for successively connecting said batteries in series to the motor to obtain a higher voltage as the accelerator is moved toward a greater power position, said transmission numbers being more than the accelerator numbers until at least some of said batteries are connected in series to the motor.

2. A control system as set forth in claim 1 wherein there is added, for the protection of the motor:
   (f) means for generating an electrical signal upon the motor current amperage reaching a maximum amperage reference;
   (g) and a switch responsive to the maximum amperage signal to operate the transmission actuator to a higher gear ratio.

3. A control system as set forth in claim 1 wherein there is added, for protection of the electric motor:
   (f) means for generating an electrical signal upon the motor reaching a maximum rpm reference;
   (g) and a switch responsive to the maximum rpm signal to operate the transmission actuator to a higher gear ratio.

4. A control system for a vehicle controlled by an operator-movable accelerator movable through a range of distance from a rest position to a full power position, said vehicle being driven by a rotary electric motor through a variable transmission variable from a high gear ratio to a low gear ratio, said vehicle having a source of current, including a plurality of batteries, comprising:
   (a) accelerator means for generating digital signals of progressive numbers dependent upon the position of the accelerator in its range;
   (b) transmission means for generating digital signals of progressive numbers dependent upon the gear ratio of the transmission;
   (c) a transmission actuator for changing the transmission to a higher or lower gear ratio;
   (d) and a comparator connected to the actuator and connected to the accelerator means and the transmission means to compare the signals from the accelerator means and the transmission means to operate the transmission actuator to a higher gear ratio when the accelerator number exceeds the transmission number and to operate the transmission actuator to a lower gear ratio when the transmission number exceeds the accelerator number;
   (e) relay switching means for successively connecting the batteries in series to obtain a higher voltage as the accelerator of the vehicle is moved toward a greater power demand; and
   (g) a time delay in said switching means to obtain a minimum time of connecting each of the batteries, said delay being at least the time of relay operation.

5. A control system for a vehicle controlled by an operator-movable accelerator movable through a range of distance from a rest position to a full-power position and controlled further by an operator-movable brake, said vehicle being driven by a rotary electric motor also capable of generating electricity when mechanically driven, said motor being connected to a variable transmission variable from a high gear ratio to a low gear ratio, said vehicle having a source of current, comprising:
   (a) accelerator means for generating digital signals of progressive numbers dependent upon the position of the accelerator in its range;
   (b) transmission means for generating digital signals of progressive numbers dependent upon the gear ratio of the transmission;
   (c) a transmission actuator for changing the transmission to a higher or lower gear ratio;
   (d) a comparator connected to the actuator and to the accelerator means and the transmission means to compare the signals from the accelerator means and the transmission means to operate the transmission actuator to a lower gear ratio when the transmission number exceeds the accelerator number;
   (e) means for sensing the voltage of the motor when acting as a generator;
   (f) and a switch that is normally open at low accelerator numbers connected to the current source and the motor and operated by the voltage-sensing means and which closes when the generator voltage exceeds the voltage of the current source to thereby create regenerative braking.

6. A control system as set forth in claim 5 wherein there is added:
(g) a regenerative current sensor and;
(h) means connected to the sensor and to the transmission actuator and responsive to a sensed current reference to thereby vary the motor rpm to obtain a selected regenerative current.

7. A control system as set forth in claim 6 wherein the regenerative current sensor is provided with a first current reference about which the transmission is shifted to maintain the regeneration current at this reference and is provided with a second different current reference operative only when the brake is actuated and about which the transmission is shifted to obtain a regeneration current at this second current reference.

8. A control system for a vehicle controlled by an operator-movable accelerator movable through a range of distance from a rest position to a full-power position and controlled further by an operator-movable brake, said vehicle being driven by a rotary electric motor, said motor also being capable of generating electricity when mechanically driven, said motor being connected to a variable transmission variable from a high gear ratio to a low gear ratio, said vehicle having a source of current, comprising:
(a) a normally open battery switch closed by manually advancing the accelerator to connect the current source to the motor when the accelerator is advanced past its rest position, and which opens when the accelerator is released;
(b) brake switch operated by the brake to operate the battery switch to connect the current source to the motor when the brake is operated;
(c) and a generator voltage sensor interposed between the brake switch and the battery switch to prevent closing of the battery switch except when the generator voltage exceeds the voltage of the current source and to render the brake switch inoperable when the generated voltage of the motor is less than the voltage of the current source;
(d) means for varying the gear ratio of the transmission;
(e) and a regenerative current sensor connected to the means for varying the gear ratio, to thereby vary the motor rpm to obtain a selected range of regenerative current.

9. A control system for a vehicle controlled by an operator-movable accelerator movable through a range of distance from a rest position to a full-power position and controlled further by an operator-movable brake, said vehicle being driven by a rotary electric motor-generator, said motor-generator also being capable of generating electricity when mechanically driven, said motor-generator being connected to a variable transmission variable from a high gear ratio to a low gear ratio, said vehicle having a source of current comprising:
(a) a normally open battery switch closed by manually advancing the accelerator to connect the current source to the motor-generator when the accelerator is advanced past its rest position and which opens when the accelerator is released;
(b) and a generator voltage sensor connected to the motor-generator and the battery switch to close the battery switch when the voltage of the motor-generator exceeds the voltage of the source of current, to thereby obtain regenerative braking when the operator lets up on the accelerator without applying the brakes;
(c) an actuator for the variable transmission to change the gear ratio;
(d) and a generator current sensor having a reference connected to the actuator to decrease the gear ratio of the transmission when the current is less than a reference and to increase the gear ratio when the current is greater than the reference.

10. A control system for a vehicle controlled by an operator-movable accelerator movable through a range of distance from a rest position to a full power position, said vehicle being driven by a rotary electric motor through a variable transmission variable from a high gear ratio to a low gear ratio, said vehicle having a plurality of batteries, comprising:
(a) accelerator means for generating signals of progressive quantity starting at low quantity dependent upon the position of the accelerator in its range;
(b) transmission means for generating signals of progressive quantity above said low quantity dependent upon the gear ratio of the transmission;
(c) a transmission actuator for changing the transmission to a higher or lower gear ratio;
(d) and a comparator connected to the actuator and to the accelerator means and the transmission means to compare the signals from the accelerator means and the transmission means to operate the transmission actuator to a higher gear when the accelerator signal is greater than the transmission signal and the operate the transmission actuator to a lower gear ratio when the transmission quantity exceeds the accelerator quantity;
(e) and switching means responsive to accelerator position for successively connecting said batteries in series to said motor to obtain a higher voltage as the accelerator is moved toward a greater power position, whereby signal matching takes place after some of said batteries are connected in series to the motor.

11. A servo loop for controlling a variable speed transmission on an electric vehicle having an accelerator and an electric motor and a variable speed transmission, comprising:
(a) means for producing a signal progressive in quantity as the accelerator is advanced;
(b) means for producing a signal progressive in quantity as the transmission varies from a low-speed ratio to a high-speed ratio;
(c) means for comparing the two signals;
(d) and an actuator controlled by the comparing means for shifting the transmission to a higher gear ratio if the accelerator signal is greater and for shifting to a lower gear ratio if the transmission signal is greater,
said transmission signal constituting a feedback in the servo loop of comparing means, actuator, transmission, accelerator signal, and transmission signal;
(e) a plurality of batteries connected to said motor
(f) and switching means responsive to accelerator advance for successively connecting said batteries in series to attain an operational motor voltage.

12. A control system for a vehicle controlled by an operator-movable accelerator movable through a range of distance from a rest position to a full-power position, said vehicle being driven by a rotary electric motor-generator through a variable transmission variable from a high gear ratio to a low gear ratio, comprising:

(a) a plurality of batteries;

(b) means for successively connecting the batteries in series to the electric motor-generator as the accelerator is moved from a rest position to a full power position;

(c) accelerator means for generating digital signals of progressive numbers dependent upon the position of the accelerator in its range;

(d) transmission means for generating digital signals of progressive numbers dependent upon the gear ratio of the transmission;

(e) a transmission actuator for changing the transmission to a higher or lower gear ratio;

(f) and a comparator connected to the transmission means, to the accelerator means and to the transmission actuator to operate said transmission actuator to a higher gear ratio when the accelerator number exceeds the transmission number and to operate the transmission actuator to a lower gear ratio when the transmission number exceeds the accelerator number, whereby said motor-generator acts to brake the vehicle by regenerative current when the accelerator is in a position of low demand and the vehicle is moving faster than is normally associated with said accelerator demand.

* * * * *